April 15, 1924.

Re. 15,819

J. W. McCRONE

REFRIGERATOR

Original Filed June 1, 1920

Witness
H. Woodard

Inventor
J. W. McCrone

By H. R. Wilson & Co
Attorneys

Reissued Apr. 15, 1924. Re. 15,819

UNITED STATES PATENT OFFICE.

JOHN WALKER McCRONE, OF KANSAS CITY, MISSOURI.

REFRIGERATOR.

Original No. 1,387,159, dated August 9, 1921, Serial No. 385,663, filed June 1, 1920. Application for reissue filed August 3, 1922. Serial No. 579,511.

*To all whom it may concern:*

Be it known that I, JOHN WALKER McCRONE, a citizen of the United States, residing at Kansas City, in the county of Jackson and State of Missouri, have invented certain new and useful Improvements in Refrigerators, of which the following is a specification, containing a full, clear, and exact description, reference being had to the accompanying drawings, forming a part hereof.

My invention relates to improvement in the means and method used in reducing the temperature of refrigerators, by the use of salt and ice containers, or brine containers connected with a source of refrigeration.

The objects of my invention are, first, to provide metallic tanks or containers, constructed to carry a quantity of broken ice and salt, or brine connected with a source of refrigeration, and having a plurality of vertical flanges extending laterally from the sides thereof, for the purpose of increasing the metallic surfaces of the containers or tanks exposed to the air to be cooled.

Second: to provide a means to convey salt water or brine from the inside of the tanks or containers to the outside and to the flanges attached thereto, for the purpose of removing frost and ice and to prevent the accumulation of frost and ice upon the outside of the tanks and the vertical flanges attached thereto.

Third: to provide a means for replenishing the salt and ice containers, or brine containers with a source of refrigeration, or refrigerating material.

Fourth: to provide the containers with a means of drainage.

Fifth: to provide a means of increasing or diminishing the refrigerating surface exposed to the air content of the refrigerator.

Sixth: to provide a means of refrigeration adaptable to many, or all styles, designs or plans of refrigerators.

The novelty in the invention resides in the various features of construction and the combination and arrangement of parts, which are hereinafter fully described and claimed and shown in the accompanying drawings, wherein:—

Figure 1:
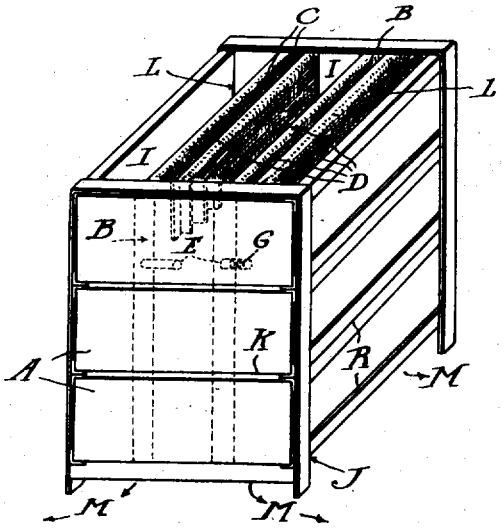
Figure 2:
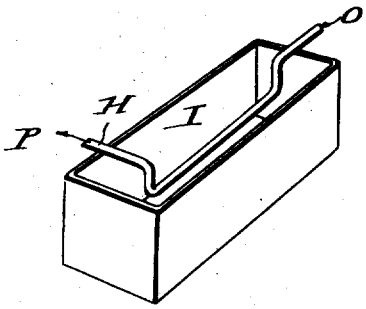

Fig. 1 is a perspective view of a device embodying the principles of my invention; and Fig. 2 is a perspective view of one of the containers for the refrigerating material, showing a coil of pipe from a source of refrigeration associated with the container but not illustrating the flanges upon the outside of the container or the means for conveying salt water or brine from the inside thereof to the outside.

In the drawings, the letter J represents a frame or rack adapted to be placed in the ice compartment of a refrigerator. This frame or rack is preferably of an open or skeleton type and is provided with sets of horizontally extending and vertically spaced runs R, upon which rest and are slidably mounted a plurality of horizontal and vertically spaced comparatively shallow trays.

Each of the trays has front and rear end-plates A to which are secured a plurality of comparatively narrow tanks I. The drawings illustrate each of the trays as having three of the tanks I arranged side by side. The adjacent tanks of each tray are spaced short distances apart horizontally so as to provide air spaces between them, and disposed in these air spaces and extending laterally between the adjacent tanks are vertical sheet metal flanges C.

The tanks I of each tray are connected by pipes E, and one of these pipes is provided with a three-way cock G for the purpose of draining the tanks.

When the trays, which are each composed of the horizontally spaced tanks, are placed in position in the rack J, the trays will be disposed one above the other in closely spaced relation with horizontal air spaces K between them and with the spaces between the tanks I forming vertical air ducts B extending from the bottom to the top of the structure and communicating with the air spaces K.

The tanks I are intended to be filled with a mixture of ice and salt, but other means of refrigeration may be employed. For instance, brine may be placed in the tanks I, in which case it may be cooled by brine circulating through a pipe H extending through the tanks from an ice machine or other source of refrigeration.

In order to prevent the formation of frost or ice upon the outside of the tanks I, sheets D of fibrous or textile material are arranged along the insides of the tanks from end to end and from their bottoms to and over the top edges and then down the outsides to the flanges C. These sheets D will convey salt water or brine to the outside surfaces of the tanks, and this will remove and prevent frost and ice from forming thereon.

The manner or method of using this means of refrigeration, is to fill the tanks of each section with ice and salt. The frame J having been placed in the ice compartment of a refrigerator, the trays are placed on their respective slides and the door to the ice compartment closed. The arrows L and M show the manner in which the air travels between the tanks. The ice and salt mixture produces a very low temperature at the trays. The warm air is cooled and settles to the bottom of the ice compartment. This action of the air produces a circulation of air, which extends to all parts of a refrigerator connected with the ice compartment. The intense cold produced in the tanks I causes moisture to condense and form ice and frost on the outside of the tanks I and the vertical flanges C, but the salt water formed by the ice and salt is conveyed to the outside surfaces of the tanks I and the flanges C, and melts the ice and frost, also prevents it from forming. When the trays I need re-icing, the water may be drawn off by the drain cocks G. The top salt and ice tray may be withdrawn wholly or the greater part of the way from its place in the frame or rack J, and may be filled with salt and ice and then replaced. As many trays may be charged with ice and salt as appears necessary. When it is desired to use another means of refrigeration, such as brine circulating from an ice machine or other source of refrigeration, the coils are introduced into the trays I filled with brine which is reduced to a very low temperature. The salt water conveying material D furnishes brine to the outside of the tanks. The frost is kept off and the combination much more efficient than the coil alone.

Containers of brine formed by ice and salt are always coldest at their bottom portions. Hence, by having a given quantity of brine disposed in trays arranged one above another in the ice compartment of a refrigerator, the warmer air rising to the top of the refrigerator will be more effectively cooled than it would be in case only one deep brine container were used. This arrangement, together with the vertical horizontal air circulating passages between the numerous tanks or trays, makes the device very efficient and reliable in operation.

Having thus described my invention, what I claim as new therein and desire to secure by Letters Patent of the United States is:

1. In a refrigerator a salt and ice container, consisting of a plurality of rectangular shaped tanks, spaced apart from each other and connected at their ends, in such a manner as to make up a section having ice and salt tanks alternately with vertical air spaces between them; vertical wings or flanges extending from the sides of the ice and salt containers, sheets of fibrous or textile material disposed on the inner and outer surfaces of the salt and ice containers, whereby salt water is conveyed from the inside to the outside of the containers, and the vertical wings or flanges, for the purpose of preventing or removing frost and ice thereon.

2. The combination of a plurality of salt and ice tanks or containers spaced apart from each other, a plurality of vertical air spaces formed by such spacing apart, a plurality of vertical wings or flanges extending laterally from the sides of the containers into the vertical air spaces between them, sheets of fibrous or textile material disposed on the inner and outer surfaces of the salt and ice containers for the purpose of conveying salt water to the outside of the containers and to the flanges attached to the containers for the purpose of removing frost and ice therefrom, a plurality of pipes connecting tanks, cocks for the purpose of drainage; with a frame work so arranged that several containers may be placed one above another in such a manner that the vertical air flues caused by the several ice tanks being spaced apart laterally from each other will register and form a continuous vertical air flue.

3. In an air cooling apparatus, the combination of a plurality of comparatively narrow tanks for refrigerating material, and means for supporting said tanks close together in vertical columns and horizontal rows, providing intersecting horizontal and vertical air passages between them.

4. In an air cooling apparatus, the combination of a plurality of trays for refrigerating material, each of said trays being composed of comparatively narrow tanks arranged side by side in closely spaced relation providing vertical air passages between such tanks, and means for supporting said trays one above another in closely spaced relation providing horizontal air passages between them communicating with said vertical air passages.

5. In an air cooling apparatus, the combination of a plurality of trays for refrigerating material, each of said trays being composed of comparatively narrow tanks arranged side by side in closely spaced relation providing vertical air passages between such tanks, front and rear plates to which the ends of the tanks of each tray are rigidly fastened, and means for supporting said trays one above another in closely spaced relation providing horizontal air passages between them communicating with said vertical air passages.

6. An appliance for the ice compartments of refrigerators, comprising a skeleton tray supporting rack having a plurality of horizontally extending and vertically spaced sets of tray supporting runs, said rack having all of its parts rigidly fastened together and being adapted to be placed as a unit in the ice compartment of a refrigerator, and trays slidably mounted in said rack upon said runs, said trays being arranged one above another in closely spaced relation, forming horizontal air circulating passages between them.

7. A means for removing and preventing the formation of frost and ice upon the outsides of containers of refrigerating material, comprising in combination, an open container for refrigerating material, refrigerating material including a quantity of brine disposed in said container, and a sheet of fibrous material extending over the wall of said container from the inside thereof to the outside, said sheet dipping into said brine contained in said container and conveying some of the same to the outside of the latter..

In testimony whereof I have signed my name to this specification in the presence of two subscribing witnesses.

JOHN WALKER McCRONE.

Witnesses:
OSCAR E. GRIMM,
AGNES A. GRIMM.